US010508038B2

(12) United States Patent
Tonegawa et al.

(10) Patent No.: US 10,508,038 B2
(45) Date of Patent: Dec. 17, 2019

(54) CARBON MATERIAL, METHOD FOR MANUFACTURING SAME, AND USE THEREOF

(71) Applicant: SHOWA DENKO K.K., Minato-ku, Tokyo (JP)

(72) Inventors: Akihisa Tonegawa, Tokyo (JP); Daisuke Kohno, Tokyo (JP); Daisuke Harada, Tokyo (JP); Yasuaki Wakizaka, Tokyo (JP)

(73) Assignee: SHOWA DENKO K.K., Tokyo (JP)

( * ) Notice: Subject to any disclaimer, the term of this patent is extended or adjusted under 35 U.S.C. 154(b) by 149 days.

(21) Appl. No.: 15/552,830

(22) PCT Filed: Feb. 16, 2016

(86) PCT No.: PCT/JP2016/054360
§ 371 (c)(1),
(2) Date: Aug. 23, 2017

(87) PCT Pub. No.: WO2016/136524
PCT Pub. Date: Sep. 1, 2016

(65) Prior Publication Data
US 2018/0029891 A1    Feb. 1, 2018

(30) Foreign Application Priority Data

Feb. 24, 2015  (JP) .................. 2015-033989

(51) Int. Cl.
| | |
|---|---|
| *H01M 6/16* | (2006.01) |
| *C01B 32/205* | (2017.01) |
| *H01M 4/587* | (2010.01) |
| *H01M 10/0525* | (2010.01) |
| *H01M 10/0569* | (2010.01) |
| *C01B 32/05* | (2017.01) |
| *H01M 4/133* | (2010.01) |
| *H01M 4/505* | (2010.01) |
| *H01M 4/525* | (2010.01) |
| *H01M 4/583* | (2010.01) |
| *H01M 4/62* | (2006.01) |
| *H01M 4/66* | (2006.01) |

(52) U.S. Cl.
CPC ............ *C01B 32/205* (2017.08); *C01B 32/05* (2017.08); *H01M 4/133* (2013.01); *H01M 4/505* (2013.01); *H01M 4/525* (2013.01); *H01M 4/583* (2013.01); *H01M 4/587* (2013.01); *H01M 4/623* (2013.01); *H01M 4/625* (2013.01); *H01M 4/661* (2013.01); *H01M 10/0525* (2013.01); *H01M 10/0569* (2013.01); *C01P 2002/72* (2013.01); *C01P 2002/74* (2013.01); *C01P 2002/82* (2013.01); *C01P 2004/51* (2013.01); *C01P 2004/60* (2013.01); *C01P 2006/10* (2013.01); *C01P 2006/11* (2013.01); *C01P 2006/12* (2013.01); *H01M 2220/10* (2013.01); *H01M 2220/20* (2013.01); *H01M 2220/30* (2013.01); *Y02T 10/7011* (2013.01)

(58) Field of Classification Search
CPC ...... H01M 4/133; H01M 4/505; H01M 4/525; H01M 4/583; H01M 4/587; H01M 4/623; H01M 4/625; H01M 4/661; H01M 10/0525; H01M 10/0569; H01M 2220/20; H01M 10/30
See application file for complete search history.

(56) References Cited

U.S. PATENT DOCUMENTS

2014/0057166 A1    2/2014  Yokoyama et al.

FOREIGN PATENT DOCUMENTS

| JP | 2002-241118 A | 8/2002 |
|---|---|---|
| JP | 2004-210634 A | 7/2004 |
| JP | 2005-158725 A | 6/2005 |
| JP | 4781659 B2 | 9/2011 |
| JP | 5270050 B1 | 8/2013 |
| JP | 2013-216563 A | 10/2013 |
| JP | 2013-258130 A | 12/2013 |
| WO | 2004/056703 A1 | 7/2004 |
| WO | 2013/171985 A1 | 11/2013 |

OTHER PUBLICATIONS

International Search Report for PCT/JP2016/054360 dated Apr. 5, 2016 [PCT/ISA/210].

*Primary Examiner* — Jane J Rhee
(74) *Attorney, Agent, or Firm* — Sughrue Mion, PLLC

(57) ABSTRACT

The present provides a carbon material containing 50 to 1,000 ppm by mass of vanadium (V), wherein a mean particle diameter D50 is 3 to 7 μm; a tapping density after 400 times of tapping is 0.40 to 1.00 g/cm³; a BET specific surface area is 4.0 to 12.0 m²/g; an R value (ID/IG) measured in the spectrum observed by Raman spectroscopy is 0.10 to 0.30; and an interplanar spacing $d_{002}$ of plane (002) (nm) and $Lc_{002}$ (nm) as being the size in the c-axis direction of the graphite crystals satisfy the relationship represented by the following formulae (1) and (2)

$$0.3362 \leq d_{002} \leq 0.3370 \quad (1)$$

$$-23660 \times d_{002} + 8010 \leq Lc_{002} \leq -23660 \times d_{002} + 8025 \quad (2);$$

which is suitable for a non-aqueous electrolytic secondary battery having a low resistance and a high coulomb efficiency; a method for producing the same; a carbon material for a battery electrode; an electrode; and a lithium-ion secondary battery using the above-described carbon material.

13 Claims, No Drawings

CARBON MATERIAL, METHOD FOR MANUFACTURING SAME, AND USE THEREOF

CROSS REFERENCE TO RELATED APPLICATIONS

This application is a National Stage of International Application No. PCT/JP2016/054360, filed on Feb. 16, 2016, which claims priority from Japanese Patent Application No. 2015-033989, filed on Feb. 24, 2015, the contents of all of which are incorporated herein by reference in their entirety.

TECHNICAL FIELD

The present invention relates to a carbon material, a method for manufacturing the same, and use of the same. Specifically, the present invention relates to a non-aqueous electrolyte secondary battery being excellent in the propylene carbonate (PC) durability, charge-discharge cycle characteristics at a low temperature, storage characteristics at a high temperature, and cycle characteristics at a high temperature and having low resistance and high coulomb efficiency.

BACKGROUND ART

A lithium ion battery has been used as a power source of portable electronic devices and the like. Lithium-ion batteries originally had many problems such as inadequate battery capacity and a short charge-discharge cycle life. At present, such problems have been overcome and the application of lithium ion batteries have extended from light electrical appliances such as mobile phones, notebook computers and digital cameras to heavy electrical appliances such as power tools and electric vehicles. In addition, lithium ion batteries are expected to be used particularly as a power source for automobiles, and research and development on an electrode material, a cell structure and the like have been actively conducted.

The lithium ion batteries used as a power source for automobiles are required to be excellent in charge-discharge cycle characteristics at a low temperature, storage characteristics at a high temperature, and cycle characteristics at a high temperature, and to have low resistance and high coulomb efficiency, and various approaches have been taken to address each of the challenges.

For example, Japanese Patent No. 5270050 (US 2014/057166 A1; Patent Document 1) discloses composite graphite particles having a carbonaceous layer on the surface of graphite, which are useful for a negative electrode material and which can provide a lithium ion battery having good cycle characteristics during low-current charge and discharge, input-output characteristics, and high-current cycle characteristics; a method for manufacturing the same; and an electrode sheet and a lithium ion battery using the same.

A current graphite-based negative electrode material has a problem that it decomposes PC serving as a solvent of the electrolyte at the time of charging, resulting in a significant decrease in the initial charge-discharge efficiency in some cases. It is expected that an electrolyte using PC undergoes further growth, and there is an urgent need to develop a negative electrode material which has less impact on PC.

Japanese Patent No. 4781659 (Patent Document 2) has developed a negative electrode material that deactivates the graphite surface to thereby improve the coulomb efficiency, and reduces impact on PC, by subjecting a carbonaceous material containing vanadium to heat treatment at 3,000° C. or higher. Use of PC in an electrolyte makes it possible to provide lithium ion batteries being more excellent in battery characteristics at a low temperature.

In JP 2002-241118 (Patent Document 3), the carbon surface is coated with vanadium oxide, but has had no effect other than improving the initial efficiency.

PRIOR ART

Patent Documents

Patent Document 1: Japanese Patent No. 5270050 (US 2014/057166 A1)
Patent Document 2: Japanese Patent No. 4781659
Patent Document 3: JP 2002-241118 A

DISCLOSURE OF THE INVENTION

Problems to be Solved by the Invention

In conventional technologies as described above, improvement of specific battery characteristics has involved sacrifice of the other battery characteristics. Accordingly, there has been a demand for improvement of a greater variety of battery characteristics at the same time An object of the present invention is to provide a carbon material, which is excellent in charge-discharge cycle characteristics at a low temperature, storage characteristics at a high temperature, and cycle characteristics at a high temperature, can attain low resistance and high coulomb efficiency at the same time, and is capable of using a non-aqueous organic electrolyte that enables improvement of battery characteristics at a low temperature; a method for producing the carbon material; and an electrode sheet and a lithium ion battery using the carbon material.

Means to Solve the Problem

The present invention comprises the following constituents:

[1] A carbon material containing 50 to 1,000 ppm by mass of vanadium (V), wherein a 50% particle diameter in a volume-based cumulative particle size distribution measured by a laser diffraction method, D50, is 3 to 7 μm; a tapping density after 400 times of tapping is 0.40 to 1.00 g/cm$^3$; a BET specific surface area is 4.0 to 12.0 m$^2$/g; an R value (ID/IG) as being an intensity ratio between a peak intensity ID of a peak in a vicinity of 1350 cm$^{-1}$ and a peak intensity IG of a peak in a vicinity of 1580 cm$^{-1}$ measured in a spectrum observed by Raman spectroscopy is 0.10 to 0.30; and an interplanar spacing of (002) plane, $d_{002}$ (nm), and a size in a c-axis direction of the graphite crystals, Lc (nm), which values are determined by an X-ray diffraction method, satisfy relationships represented by following formulae (1) and (2)

$$0.3362 \leq d_{002} \leq 0.3370 \quad (1)$$

$$-23660 \times d_{002} + 8010 \leq Lc_{002} \leq -23660 \times d_{002} + 8025 \quad (2)$$

[2] The carbon material according to [1] above, wherein vanadium contained in the carbon material exists as at least one compound selected from an oxide and a carbide.
[3] The carbon material according to [2] above, wherein the carbide is at least one member selected from VC, V$_4$C$_3$ and V$_5$C.

[4] The carbon material according to [2] above, wherein the oxide is at least one member selected from VO, $V_2O_3$, $V_2O_5$, $VO_2$ and $V_6O_{13}$.

[5] The carbon material according to any one of [1] to [4] above, wherein vanadium is uniformly distributed from the surface to the core portion of graphite particles.

[6] A method for producing a carbon material according to any one of [1] to [5] above, comprising graphitization using coke as a raw material, in which coke a 50% particle diameter in a volume-based cumulative particle size distribution measured by a laser diffraction method, D50, is 7 μm or less, and the a value defined by a following formula:

$$\alpha = S1/S2$$

(in the formula, S1 represents the sum of a peak areas of aromatic hydrocarbons in which 4 benzene rings are condensed in the volatile components of the coke in a GC-MS chart, and S2 represents the sum of peak areas of aromatic hydrocarbons in which 1 to 4 benzene rings are condensed in a GC-MS chart.)

is 0.25 to 0.40, wherein the graphitization is conducted by adding a vanadium compound in an amount of 200 to 10,000 ppm by mass in terms of vanadium to the raw material; the graphitization step comprises multiple heating steps; a temperature in a last heating step is set to 3,000 to 3,200° C.; and temperatures in other heating steps than the last heating step is set to 2,000 to 2,400° C.

[7] The method for producing a carbon material according to [6] above, comprising a cooling step between each heating step so as to decrease a treatment temperature to 1,300° C. or lower.

[8] The method for producing a carbon material according to [6] and [7] above, comprising adding a calcium compound that is at least one member selected from CaO, $Ca(OH)_2$, $CaCO_3$, $Ca(COO)_2$, $Ca(CH_3COO)_2$, $Ca(NO_3)_2$ in an amount of 1 to 10,000 ppm by mass in terms of calcium to the carbon material treated in the above-described graphitization step and conducting re-graphitization at 3,000 to 3,200° C.

[9] A carbon material for a battery electrode comprising the carbon material according to any one of [1] to [5] above.

[10] A paste for an electrode comprising the carbon material for a battery electrode according to [9] above and a binder.

[11] An electrode for a lithium ion secondary battery comprising a formed body of the paste for an electrode according to [10] above.

[12] A lithium-ion secondary battery comprising the electrode according to [11] above as a constituting element.

[13] The lithium ion secondary battery according to [12] above, using an electrolyte containing 20 vol % or more of propylene carbonate (PC).

Effects of the Invention

The present invention makes it possible to obtain a battery electrode, which is excellent in PC durability, charge-discharge cycle characteristics at a low temperature, storage characteristics at a high temperature, and cycle characteristics at a high temperature, and can attain low resistance and high coulomb efficiency at the same time.

MODE FOR CARRYING OUT THE INVENTION

Hereinafter, the carbon material of the present invention is to be described in details.

[50% Particle Diameter of the Carbon Material]

The carbon material of the present invention has a 50% particle diameter in a volume-based cumulative particle size distribution measured by a laser diffraction method, D50, of 3 to 7 μm, preferably 4 to 6 μm. Most of the widely-used carbon materials have a D50 exceeding 10 μm, but a material having a smaller diameter is preferable from the viewpoint of decrease in resistance. However, when the carbon material has an excessively small particle diameter, it will develop difficulty in producing a slurry to be applied on an electrode due to aggregation and increase in the BET specific surface area. In addition, making the particle diameter be smaller will face a problem in manufacturing that special equipment consuming more energy is needed.

[BET Specific Surface Area of the Carbon Material]

The BET specific surface area of the carbon material of the present invention is 4.0 to 12.0 $m^2/g$, preferably 5.0 to 10.0 $m^2/g$, more preferably 6.0 to 8.0 $m^2/g$. A carbon material having a higher BET specific surface area is preferable from the viewpoint of the decrease in resistance. However, when the BET specific surface area is too high, particles of the carbon material tend to aggregate to thereby make the production of slurry difficult. In addition, it will increase side reactions when a battery is fabricated using the carbon material, resulting in problems of decrease in the coulomb efficiency and deterioration of storage characteristics at a high temperature and cycle characteristics at a high temperature.

[Relationship between the Volatile Component of Raw Materials of the Carbon Material and the BET Specific Surface Area]

At the time of pulverization to reduce the particle diameter, each of raw materials of the carbon material has a different surface roughness, and a desired BET specific surface area cannot be attained after graphitization in some cases.

In the gas chromatography mass spectroscopy analysis (GC-MS) of the volatile components generated at the time of heating coke containing 5 mass % or more of volatile components, S1 represents the sum of the peak areas of aromatic hydrocarbons having a structure in which 4 benzene rings are condensed such as pyrene; S2 represents the sum of the peak areas of aromatic hydrocarbons in which 1 to 4 benzene rings are condensed; and the ratio between S1 and S2 (S1/S2) is designated as a. It was confirmed that a desirable BET specific surface area can be attained after graphitization by using the coke having the a value of preferably 0.25 to 0.40, more preferably 0.25 to 0.35, still more preferably 0.30 to 0.35 is used as a raw material.

As a raw material of calcined coke, for example, petroleum pitch, coal pitch, and the mixture thereof can be used. There is not particular limit to the method of pulverization, and pulverization can be performed using a known jet mill, hammer mill, roller mill, pin mill, vibration mill or the like.

[Laser Raman Peak Intensity Ratio (R Value) of the Carbon Material]

By determining R value (ID/IG) as being the intensity ratio between the peak intensity ID of a peak in the vicinity of 1350 $cm^{-1}$ and the peak intensity IG of a peak in the vicinity of 1580 $cm^{-1}$ measured in the spectrum observed by laser Raman spectroscopy, the state of the surface of the carbon material can be estimated.

A larger R value means a low degree of crystallinity, and when the R value increases, resistance tends to decrease and durability regarding PC (hereinafter, may be referred to as "PC durability") tends to increase. However, when the R value is too high, it shows effect of deterioration of storage characteristics at a high temperature and cycle characteristics at a high temperature. The R value of the carbon material of the present invention is 0.10 to 0.30, preferably 0.10 to 0.25, more preferably 0.15 to 0.25.

[Relationship between Interplanar Spacing $d_{002}$ and the Size $Lc_{002}$ in the C-axis Direction of the Carbon Material]

The relationship between the interplanar spacing $d_{002}$ (nm) of (002) plane and Lc002 (nm) as being the size in the c-axis direction of the graphite crystals, which values are determined by the X-ray diffraction method, are related to PC durability, coulomb efficiency, storage characteristics at a high temperature and cycle characteristics at a high temperature of the carbon material.

In the carbon material of the present invention, the interplanar spacing $d_{002}$ (nm) of (002) plane and the size Lc002 (nm) in the c-axis direction of the graphite crystals satisfy the relationship represented by the following formulae (1) and (2) from the viewpoint of the battery capacity.

$$0.3362 \leq d_{002} \leq 0.3370 \quad (1)$$

$$-23660 \times d_{002} + 8010 \leq Lc_{002} \leq -23660 \times d_{002} + 8025 \quad (2)$$

Furthermore, it is preferable that the interplanar spacing $d_{002}$ (nm) of (002) plane and the size Lc002 (nm) in the c-axis direction satisfy the relationship represented by the following formulae (3) and (4).

$$0.3362 \leq d_{002} \leq 0.3368 \quad (3)$$

$$-23660 \times d_{002} + 8015 \leq Lc_{002} \leq -23660 \times d_{002} + 8020 \quad (4)$$

[Content of the Vanadium Compound]

The carbon material of the present invention contains a vanadium compound in an amount of 50 to 1,000 ppm by mass, preferably 100 to 750 ppm by mass, more preferably 200 to 500 ppm by mass in terms of vanadium. The coulomb efficiency is significantly improved when the vanadium compound content is 50 ppm by mass or more, while the coulomb efficiency is reduced when the vanadium compound content is more than 1,000 ppm by mass.

The carbon material of the present invention is obtained by adding a vanadium compound to the coke having a D50 of 7 μm or less, and the above-described a value of 0.25 to 0.40 as being a raw material to be mixed and dispersed in the coke, and graphitizing the mixture. The surface of the carbon material is deactivated by the graphitization and the R value is increased. This makes it possible not only to improve the coulomb efficiency but also to increase the PC durability. It should be noted that it is necessary to disperse vanadium uniformly from the surface to the core portion of a graphite particle to obtain the effect due to the addition of vanadium. As a vanadium compound, at least one member selected from an oxide and a carbide is used. Examples of the oxides include VO, $V_2O_3$, $V_2O_5$, $VO_2$ and $V_6O_{13}$, and examples of the carbides include VC, $V_4C_3$ and $V_5C$.

In order to set the vanadium content after the graphitization within the above-mentioned range, graphitization is conducted by mixing and dispersing a vanadium compound in an amount of 200 to 10,000 ppm by mass, preferably 3,000 to 10,000 ppm by mass, more preferably 5,000 to 10,000 ppm by mass in terms of vanadium in the carbon material.

[Graphitization Temperature]

The graphitization treatment of the present invention comprises multiple heating steps. For example, in the case of the graphitization treatment comprising two heating steps, the second heating step is referred to as the last heating step. Also, it is desirable to provide a cooling step by natural cooling between each heating step.

In the graphitization treatment of the present invention, it is desirable to heat the carbon material at 3,000 to 3,200° C. in the last heating step, to heat at 2,000 to 2,400° C., preferably 2,000 to 2,200° C. in the other heating steps than the last heating step, and then to cool the carbon material to 1,300° C. or lower once in the cooling step. By the cooling, the generated gas is attached on the surface of the coke and serves a similar function to a coating. As a result, an effect of improving the initial efficiency and the PC durability can be obtained. In addition, unlike the coating, the attached gas does not cause reduction in the battery characteristics at a high temperature due to a change caused in the relationship between the interplanar spacing $d_{002}$ of (002) plane and Lc as being the size in the c-axis direction of the graphite crystals.

In the graphitization process, it is necessary to adjust the temperature in the last heating step to 3,000 to 3,200° C., preferably 3,100 to 3,200° C. from the viewpoint of the amount of the vanadium compound to be allowed to remain, and the $d_{002}$ value which is related to the capacity. When the temperature is higher than 3,200° C., the added vanadium compound evaporates and does not remain in the carbon material. When the temperature is lower than 3,000° C., it inhibits the development of the graphite crystals and it becomes difficult to obtain an electrode which is capable of storing significant amounts of lithium ions.

[Addition of a Calcium Compound and Reheating Treatment]

Regarding the carbon material of the present invention, it is possible to further increase the BET specific surface area of the carbon material by adding at least one calcium compound selected from CaO, $Ca(OH)_2$, $CaCO_3$, $Ca(COO)_2$, $Ca(CH_3COO)_2$, $Ca(NO_3)_2$ to the carbon material subjected to the graphitization treatment and by performing the graphitization treatment again. In the case where each of physical properties falls within a desirable range, the properties of the carbon material of the present invention are maintained even if this re-graphitization treatment process is added.

The amount of the calcium compound to be added is 1 to 10,000 ppm by mass, preferably 100 to 5,000 ppm by mass, more preferably 100 to 300 ppm by mass in terms of calcium. The calcium compound is mixed and dispersed in graphite and the mixture is subjected to re-graphitization.

The re-graphitization temperature is preferably 3,000 to 3,200° C., more preferably 3,100 to 3,200° C. When the temperature is lower than 3,000° C., Ca remains and has adverse effects on battery characteristics.

The calcium content after the re-graphitization is 50 ppm by mass or less, preferably 20 ppm by mass or less, more preferably 10 ppm by mass or less. The remaining Ca has adverse effects on battery characteristics.

[Carbon Material for a Battery Electrode]

A preferred carbon material for a battery electrode of the present invention comprises the above-mentioned carbon material. By using the above-mentioned carbon material as a carbon material for a battery electrode, a battery electrode which can attain excellent PC durability, charge-discharge cycle characteristics at a low temperature, storage characteristics at a high temperature, and cycle characteristics at a high temperature, low resistance and high coulomb efficiency at the same time can be obtained.

The carbon material for a battery electrode may be used as, for example, a negative electrode active material and an agent for imparting conductivity to a negative electrode of a lithium ion secondary battery.

The carbon material for battery electrodes in a preferred embodiment of the present invention may comprise the above-mentioned carbon material only. It is also possible to use the materials obtained by blending spherical natural graphite or artificial graphite having $d_{002}$ of 0.3370 nm or less in an amount of 0.01 to 200 parts by mass and preferably 0.01 to 100 parts by mass; or by blending natural or artificial graphite having $d_{002}$ of 0.3370 nm or less and aspect ratio of 2 to 100 in an amount of 0.01 to 120 parts by mass and preferably 0.01 to 100 parts by mass; based on 100 parts by mass of the carbon material. By using the carbon material mixed with other graphite materials, the carbon material can be added with excellent properties of other graphite materials while maintaining the excellent characteristics of the carbon material in a preferred embodiment of the present invention. With respect to mixing of these materials, the material to be mixed can be selected and the blending amount can be determined appropriately depending on the required battery characteristics.

Carbon fiber may also be mixed with the carbon material for battery electrodes. The mixing amount is 0.01 to 20 parts by mass, preferably 0.5 to 5 parts by mass in terms of 100 parts by mass of the above-mentioned carbon material.

Examples of the carbon fiber include: organic carbon fiber such as PAN-based carbon fiber, pitch-based carbon fiber, and rayon-based carbon fiber; and vapor-grown carbon fiber. Of those, particularly preferred is vapor-grown carbon fiber having high crystallinity and high heat conductivity. In the case of allowing the carbon fiber to adhere to the particle surfaces of the carbon material, particularly preferred is vapor-grown carbon fiber.

Vapor-grown carbon fiber is, for example, produced by: using an organic compound as a raw material; introducing an organic transition metal compound as a catalyst into a high-temperature reaction furnace with a carrier gas; and then conducting heat treatment to form fiber (see, for example, JP 60-54998 A and JP 2778434 B2). The vapor-grown carbon fiber has a fiber diameter of 2 to 1,000 nm, preferably 10 to 500 nm, and has an aspect ratio of preferably 10 to 15,000.

Examples of the organic compound serving as a material for carbon fiber include: toluene, benzene, naphthalene; gas such as ethylene, acetylene, ethane, natural gas, carbon monoxide or the like, and a mixture thereof. Of those, an aromatic hydrocarbon such as toluene or benzene is preferred.

The organic transition metal compound includes a transition metal serving as a catalyst. Examples of the transition metal include metals of Groups IVa, Va, VIa, VIIa, and VIII of the periodic table. Preferred examples of the organic transition metal compound include compounds such as ferrocene and nickelocene.

The carbon fiber may be obtained by pulverizing or disintegrating long fiber obtained by vapor deposition or the like. Further, the carbon fiber may be agglomerated in a flock-like manner.

Carbon fiber which has no pyrolyzate derived from an organic compound or the like adhering to the surface thereof or carbon fiber which has a carbon structure with high crystallinity is preferred.

The carbon fiber with no pyrolyzate adhering thereto or the carbon fiber having a carbon structure with high crystallinity can be obtained, for example, by firing (heat-treating) carbon fiber, preferably, vapor-grown carbon fiber in an inactive gas atmosphere. Specifically, the carbon fiber with no pyrolyzate adhering thereto is obtained by heat treatment in inactive gas such as argon at about 800° C. to 1,500° C. Further, the carbon fiber having a carbon structure with high crystallinity is obtained by heat treatment in inactive gas such as argon preferably at 2,000° C. or more, more preferably 2,000° C. to 3,000° C.

It is preferred that the carbon fiber contains branched fiber. Further, the fiber as a whole may have a portion having hollow structures communicated with each other. For this reason, carbon layers forming a cylindrical portion of the fiber are formed continuously. The hollow structure refers to a structure in which a carbon layer is rolled up in a cylindrical shape and includes an incomplete cylindrical structure, a structure having a partially cut part, two stacked carbon layers connected into one layer, and the like. Further, the cross-section is not limited to a complete circular shape, and the cross-section of the cylinder includes an oval shape or a polygonal shape.

The average interplanar spacing $d_{002}$ of a (002) plane by the X-ray diffraction method of the carbon fiber is preferably 0.344 nm or less, more preferably 0.339 nm or less, particularly preferably 0.338 nm or less. Further, it is preferred that a thickness in a C-axis direction ($L_c$) of crystallite is 40 nm or less.

[Paste for Electrodes]

The paste for an electrode of the present invention contains the above-mentioned carbon material for a battery electrode and a binder. The paste for an electrode can be obtained by kneading the above-mentioned carbon material for a battery electrode with a binder. A known device such as a ribbon mixer, a screw-type kneader, a Spartan granulator, a Loedige mixer, a planetary mixer, or a universal mixer may be used for kneading. The paste for an electrode may be formed into a sheet shape, a pellet shape, or the like.

Examples of the binder to be used for the paste for an electrode include known binders such as: fluorine-based polymers such as polyvinylidene fluoride and polytetrafluoroethylene; and rubber-based binders such as styrene-butadiene rubber (SBR).

The appropriate use amount of the binder is 1 to 30 parts by mass in terms of 100 parts by mass of the carbon material for a battery electrode, and in particular, the use amount is preferably about 1 to 10 parts by mass.

A solvent can be used at a time of kneading. Examples of the solvent include known solvents suitable for the respective binders such as: toluene and N-methylpyrolidone in the case of a fluorine-based polymer; water in the case of SBR; dimethylformamide; isopropanol and the like. In the case of the binder using water as a solvent, it is preferred to use a thickener together. The amount of the solvent is adjusted so as to obtain a viscosity at which a paste can be applied to a current collector easily.

[Electrode]

An electrode of the present invention comprises a formed body of the above-mentioned paste for an electrode. The electrode is obtained, for example, by applying the above-mentioned paste for an electrode to a current collector, followed by drying and pressure-forming.

Examples of the current collector include foils and mesh of aluminum, nickel, copper, stainless steel and the like. The coating thickness of the paste is generally 50 to 200 μm. When the coating thickness becomes too large, a negative electrode may not be housed in a standardized battery container. There is no particular limitation to the paste coating method, and an example of the coating method includes a method involving coating with a doctor blade or a bar coater, followed by forming with roll pressing or the like.

Examples of the pressure molding include roll pressing, plate pressing, and the like. The pressure for the pressure forming is preferably about $1\times10^3$ to $3\times10^3$ kg/cm$^2$.

[Battery]

A battery or a secondary battery can be produced, using the above-mentioned electrode as a constituent element (preferably, as a negative electrode).

The battery or secondary battery in a preferred embodiment of the present invention is described by taking a lithium ion secondary battery as a specific example. The lithium ion secondary battery has a structure in which a positive electrode and a negative electrode are immersed in an electrolytic solution or an electrolyte. As the negative electrode, the electrode in a preferred embodiment of the present invention is used.

In the positive electrode of the lithium ion secondary battery, a transition metal oxide containing lithium is generally used as a positive electrode active material, and preferably, an oxide mainly containing lithium and at least one kind of transition metal element selected from the group consisting of Ti, V, Cr, Mn, Fe, Co, Ni, Mo, and W, which is a compound having a molar ratio of lithium to a transition metal element of 0.3 to 2.2, is used. More preferably, an oxide mainly containing lithium and at least one kind of transition metal element selected from the group consisting of V, Cr, Mn, Fe, Co and Ni, which is a compound having a molar ratio of lithium to a transition metal of 0.3 to 2.2, is used. It should be noted that Al, Ga, In, Ge, Sn, Pb, Sb, Bi, Si, P, B, and the like may be contained in a range of less than 30% by mole with respect to the mainly present transition metal. Of the above-mentioned positive electrode active materials, it is preferred that at least one kind of material having a spinel structure represented by a general formula $Li_xMO_2$ (M represents at least one kind of Co, Ni, Fe, and Mn, and x is 0 to 1.2), or $Li_yN_2O_4$ (N contains at least Mn, and y is 0 to 2) be used.

Further, as the positive electrode active material, there may be particularly preferably used at least one kind of materials each including $Li_yM_aD_{1-a}O_2$ (M represents at least one kind of Co, Ni, Fe, and Mn, D represents at least one kind of Co, Ni, Fe, Mn, Al, Zn, Cu, Mo, Ag, W, Ga, In, Sn, Pb, Sb, Sr, B, and P with the proviso that the element corresponding to M being excluded, y=0 to 1.2, and a=0.5 to 1) or materials each having a spinel structure represented by $Li_z(N_bE_{1-b})_2O_4$ (N represents Mn, E represents at least one kind of Co, Ni, Fe, Mn, Al, Zn, Cu, Mo, Ag, W, Ga, In, Sn, Pb, Sb, Sr, B and P, b=1 to 0.2, and z=0 to 2).

Specifically, there are exemplified $Li_xCoO_2$, $Li_xNiO_2$, $Li_xMnO_2$, $Li_xCo_aNi_{1-a}O_2$, $Li_xCo_bV_{1-b}O_z$, $Li_xCo_bFe_{1-b}O_2$, $Li_xMn_2O_4$, $Li_xMn_cCo_{2-c}O_4$, $Li_xMn_cNi_{2-c}O_4$, $Li_xMn_cV_{2-c}O_4$, $Li_xMn_cFe_{2-c}O_4$ and $Li_xNi_dMn_cCo_{1-d-e}O_2$ (where, x=0.02 to 1.2, a=0.1 to 0.9, b=0.8 to 0.98, c=1.6 to 1.96, d=0.1 to 0.8, e=0.1 to 0.8-d, and z=2.01 to 2.3). As the most preferred transition metal oxide containing lithium, there are given $Li_xCoO_2$, $Li_xNiO_2$, $Li_xMnO_2$, $Li_xCo_aNi_{1-a}O_2$, $Li_xMn_2O_4$, $Li_xCo_bV_{1-b}O_z$ and $Li_xNi_dMn_cCo_{1-d-e}O_2$ (x=0.02 to 1.2, a=0.1 to 0.9, b=0.9 to 0.98, d=0.1 to 0.8, e=0.1 to 0.8-d, and z=2.01 to 2.3). It should be noted that the value of x is a value before starting charge and discharge, and the value increases and decreases in accordance with charge and discharge.

Although D50 of the positive electrode active material is not particularly limited, it is preferably 0.1 to 50 μm. It is preferred that the volume occupied by the particles of 0.5 to 30 μm be 95% or more. It is more preferred that the volume occupied by the particle group with a particle diameter of 3 pm or less be 18% or less of the total volume, and the volume occupied by the particle group of 15 μm or more and 25 μm or less be 18% or less of the total volume. Although the specific surface area is not particularly limited, the area is preferably 0.01 to 50 m$^2$/g, particularly preferably 0.2 m$^2$/g to 1 m$^2$/g by a BET method. Further, it is preferred that the pH of a supernatant obtained when 5 g of the positive electrode active material is dissolved in 100 ml of distilled water be 7 to 12.

In a lithium ion secondary battery, a separator may be provided between a positive electrode and a negative electrode. Examples of the separator include non-woven fabric, cloth, and a microporous film each mainly containing polyolefin such as polyethylene and polypropylene, a combination thereof, and the like.

As an electrolytic solution and an electrolyte forming the lithium ion secondary battery in a preferred embodiment of the present invention, a known organic electrolytic solution, inorganic solid electrolyte, and polymer solid electrolyte may be used, but an organic electrolytic solution is preferred in terms of electric conductivity.

As an organic electrolytic solution, preferred is a solution of an organic solvent such as diethyl ether, dibutyl ether, ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, diethylene glycol dinitrile, nitromethane, or the like. There are more preferably exemplified: a carbonate such as ethylene carbonate, butylene carbonate, diethyl carbonate, dimethyl carbonate, propylene carbonate, or vinylene carbonate; an ester such as y-butyrolactone; an ether such as dioxolan, diethyl ether, or diethoxyethane; dimethylsulfoxide; acetonitrile; tetrahydrofuran; or the like. A carbonate-based nonaqueous solvent such as ethylene carbonate or propylene carbonate may be particularly preferably used. One kind of those solvents may be used alone, or two or more kinds thereof may be used as a mixture.

A lithium salt is used for a solute (electrolyte) of each of those solvents. Examples of a generally known lithium salt include $LiClO_4$, $LiBF_4$, $LiPF_6$, $LiAlCl_4$, $LiSbF_6$, LiSCN, LiCl, $LiCF_3SO_3$, $LiCF_3CO_2$, $LiN(CF_3SO_2)_2$, and the like.

Examples of the polymer solid electrolyte include a polyethylene oxide derivative and a polymer containing the derivative, a polypropylene oxide derivative and a polymer containing the derivative, a phosphoric acid ester polymer, a polycarbonate derivative and a polymer containing the derivative, and the like.

It should be noted that there is no constraint for the selection of members required for the battery configuration other than the aforementioned members.

EXAMPLES

Hereinafter, the present invention is described in more detail by way of typical examples. It should be noted that these examples are merely for illustrative purposes, and the present invention is not limited thereto.

It should be noted that, the methods for measuring the shape, composition and properties of the carbon materials of Examples and Comparative Examples; and the characteristics of the batteries using the carbon materials in an electrode are given below.

(1) Powder XRD Measurement

A carbon powder sample and standard silicon (manufactured by National Institute of Standards and Technology (NIST)) were mixed so as to have a ratio by mass of 9 to 1 and the mixture was filled in a sample plate made of glass (recessed portion of a sample plate: 18×20 mm, depth: 0.2 mm) and subjected to measurement under the following conditions:

XRD apparatus: SmartLab manufactured by Rigaku (registered trademark)
X-ray type: Cu-Kα ray
Method for removing Kβ ray: Ni filter
X-ray output: 45 kV, 200 mA
Measurement range: 24.0 to 30.0 deg.
Scanning speed: 2.0 deg./min.

An interplanar spacing $d_{002}$ and a size in the c-axis direction $Lc_{002}$ were determined by applying the Gakushin method to the obtained waveform.

(2) 50% particle diameter in a volume-based cumulative particle size distribution (D50)

Particle size distribution analyzer: Mastersizer (registered trademark) 2000 produced by Malvern Instruments Ltd.

About 5 mg of a sample was put in a container, and water containing 0.04 mass % of a surfactant was added thereto. The measurement was performed after performing ultrasonic treatment for five minutes.

(3) Tapping Density

Tapping densimeter: Autotap manufactured by Quantachrome Instruments

About 50 g of a sample was put in a 250 ml-volume glass cylinder, and the density of the sample after performing tapping 400 times was measured.

(4) BET Specific Surface Area

Surface Area Analyzer: NOVA 2200 manufactured by Quantachrome Instruments

About 3 g of a sample was put in a BET cell (9 mm x 135 mm) and dried at 300° C. under the vacuum condition for one hour to perform measurement. $N_2$ was used as the gas for the measurement of the BET specific surface area.

(5) Raman Spectroscopic Analysis

Raman spectrometer: NRS-5100 manufactured by JASCO Corporation

The measurement was performed using an excitation wavelength of 532.36 nm.

(6) Vanadium Content and Calcium Content

ICP optical emission spectrometer: SPS3500 Series manufactured by Seiko Instruments Inc.

0.1 g of a sample was weighed out in a quartz beaker, and 0.5 ml of nitric acid (for electronics industry) and 5 ml of sulfuric acid (for measurement of toxic metals) were added thereto, and the sample was heated by a hot plate set at 480° C. Then the sample was allowed to cool naturally, and after adding 0.5 ml of nitric acid, the sample was further heated. The addition of nitric acid and heating were repeated until the content became invisible to remove carbon contained in the sample. After cooling the sample to room temperature, it was transferred to a polypropylene container by ultrapure water. A constant volume of 50 ml was obtained and the contents of vanadium and calcium was quantified by the ICP optical emission spectrometer.

(7) GC-MS

Thermal extractor: PY-2010 manufactured by Frontier Laboratories Ltd.

GC device: GC6890 manufactured by Agilent Technologies

MS device: Automass II manufactured by JEOL Ltd.

The temperature of 100 g of coke was raised from 200° C. to 800° C. at a rate of 20° C./minute. The generated volatile component was collected with liquid nitrogen, and after the extraction, the GC-MS measurement of the component was conducted. In the GC-MS chart, S1 represents the sum of the peak areas of aromatic hydrocarbons having a structure formed by a pyrene, tetracene, triphenylene, chrysene, or tetraphene skeleton, in which 4 benzene rings are condensed; S2 represents the sum of the peak areas of aromatic hydrocarbons in which 1 to 4 benzene rings are condensed; and the a value of each coke serving as a raw material was calculated from the equation of α=S1/S2.

(8) Method for Evaluating Batteries a) Production of Paste:

To 100 parts by mass of a carbon material, 1.5 parts by mass of carboxymethylcellulose (CMC) as a thickener and water were added as appropriate to adjust the viscosity. 3.8 parts by mass of an aqueous solution in which 40% of styrene butadiene rubber (SBR) fine particles as a solid ratio is dispersed was added thereto, and mixed and stirred to thereby obtain a slurry dispersion having enough flowability as a main material stock solution.

b) Production of a Negative Electrode:

The main material stock solution was applied to a high-purity copper foil to a thickness of 150 μm using a doctor blade and was dried in vacuum at 70° C. for 12 hours. After punching out the copper foil so as to obtain a piece having an applied portion of 20 cm$^2$, the piece was sandwiched between pressing plates made of super-steel and pressed so that a press pressure becomes about $1 \times 10^2$ to $3 \times 10^2$ N/mm$^2$ ($1 \times 10^3$ to $3 \times 10^3$ kg/cm$^2$) to obtain a negative electrode 1. Also, after punching out the above applied portion into a size of 16 mmφ, the portion was pressed in a similar manner to negative electrode 1 so that a press pressure becomes about $1 \times 10^2$ N/mm$^2$ ($1 \times 10^3$ kg/cm$^3$) to obtain a negative electrode 2.

c) Production of a Positive Electrode:

90 g of $Li_3Ni_{1/3}Mn_{1/3}Co_{1/3}O_2$ (D50: 7 μm), 5 g of carbon black as a conductive assistant (manufactured by TIMCAL, C45) and 5 g of polyvinylidene fluoride (PVdF) as a binder were mixed and stirred while adding N-methylpyrrolidone as appropriate to obtain a slurry dispersion.

The dispersion was applied to a uniform thickness onto an aluminum foil having a thickness of 20 μm using a roll coater. After drying, the foil was subjected to roll pressing and punched out to get a piece having an applied portion of 20 cm$^2$ to obtain a positive electrode.

d) Production of a Battery:

[Two-Electrode Cell]

In the above negative electrode 1 and positive electrode, a nickel tab and an aluminum tab were fixed to the copper foil and the aluminum foil, respectively. These electrodes were faced to each other via a polypropylene microporous membrane and laminated. After packing the laminated electrodes by an aluminum laminated film and injecting thereto an electrolyte A described below, the opening was sealed by thermal fusion bonding to fabricate a battery.

[Lithium Counter Electrode Cell]

In a cell case (inner diameter: about 18 mm) with a screwed-type lid made of polypropylene, the above negative electrode 2 and a metal lithium foil punched out into a size of 16 mmΦ were stacked by sandwiching separators (microporous films made of polypropylene (Cell Guard 2400)) therebetween. Electrolyte A or B described below was added into the cell case to obtain two kinds of cells for testing each of which has a different electrolyte.

e) Electrolyte:

Electrolyte A: In a mixed solution of 2 parts by mass of ethylene carbonate (EC) and 3 parts by mass of ethyl methyl carbonate (EMC), $LiPF_6$ was dissolved as an electrolyte so as to adjust the $LiPF_6$ concentration to 1 mol/l.

Electrolyte B: In a mixed solution of 1 part by mass of ethylene carbonate (EC), 3 parts by mass of ethyl methyl carbonate (EMC) and 1 part by mass of propylene carbonate (PC), $LiPF_6$ was dissolved as an electrolyte so as to adjust the $LiPF_6$ concentration to 1 mol/l.

f) Measurement Tests of Discharge Capacity and Initial Coulomb Efficiency:

Tests were conducted using the lithium counter electrode cell. Constant current (CC) charging was performed at 0.2 mA from a rest potential to 0.002 V. Next, the charging was switched to constant voltage (CV) charging at 0.002 V with a cut-off current value of 25.4 µA.

A discharging was performed in the constant-current mode at a current of 0.2 mA with an upper limit voltage of 1.5 V.

The test was performed in a thermostatic chamber set at 25° C. At that time, the capacity at the initial discharging was defined as a discharge capacity. Also, the ratio of the electricity of the initial charge and discharge, i.e. discharge electricity quantity/charge electricity quantity in percentage was defined as an index of the initial coulomb efficiency.

g) PC Durability

Tests were conducted using the lithium counter electrode cell. The ratio of the initial coulomb efficiency in the case of using the electrolyte B to the initial coulomb efficiency in the case of using the electrolyte A was designated as PC durability. The evaluation of PC durability was made under the same conditions as in the above-described measurement of the initial coulomb efficiency except for the change of the electrolyte.

h) Measurement of the Capacity of Two-Electrode Cells]

The constant-current (CC) and constant-voltage (CV) charging was performed at a current of 0.2 C (corresponding to about 5 mA) to an upper limit voltage of 4.15 V with a cut off current value of 1.25 mA. A discharging was performed in the constant-current mode at a current of 0.2 C with a lower limit voltage of 2.8 V. The charge/discharge was repeated four times in total, and the fourth discharge capacity was designated as the standard capacity of the two-electrode cell. The test was performed in a thermostatic chamber set at 25° C.

i) Measurement Tests of Charge/Discharge Cycle Capacity Retention Rate:

Tests were conducted using the two-electrode cell. The constant-current (CC) mode charging was performed at a constant current of 50 mA (corresponding to 2 C) from a rest potential to an upper limit voltage of 4.15 V. Next, the charging was switched to constant-voltage (CV) charging mode with a cut off current value of 1.25 mA.

A discharging was performed in the constant-current mode at a current of 50 mA with a lower limit voltage of 2.8 V.

The charge/discharge was repeated 500 cycles in thermostatic chambers set at 0° C. and 50° C., respectively, under the above-mentioned conditions.

j) Measurement Test of DC-IR:

Tests were conducted using the two-electrode cell. On the basis of the battery capacity obtained by the initial battery capacity (1 C=25 mAh), the constant-current (CC) mode discharging at 0.1 C was performed from a fully charged state at 0.1 C for five hours (State of Charge (SOC): 50%). After a rest of 30 minutes, discharging at 25 mA for five seconds was conducted to determine the Direct Current Internal Resistance, DC-IR, from the amount of voltage drop, $\Delta V$ (unit: V), according to Ohm's law ($R=\Delta V$ [V]/0.025 [A]; unit: Ω). The tests were conducted in a thermostatic chamber set at 25° C.

k) Measurement Test of Storage/Restored Capacity Retention Rate

Tests were conducted using the two-electrode cell. The constant-current (CC) and constant-voltage (CV) charging was performed at a current of 0.2 C (corresponding to about 5 mA) to an upper limit voltage of 4.15 V with a cut off current value of 1.25 mA. After leaving the charged cell to stand in a thermostatic set at 60° C. for one month, a discharging was performed in the constant-current mode at a current of 0.2 C with a lower limit voltage of 2.8 V to measure the capacity. The measured capacity was designated as a storage capacity. Furthermore, the constant-current (CC) and constant-voltage (CV) charging was performed at a current of 0.2 C (corresponding to about 5 mA) to an upper limit voltage of 4.15 V with a cut off current value of 1.25 mA, and a discharging was performed in the constant-current mode at a current of 0.2 C with a lower limit voltage of 2.8 V to measure the capacity. The measured capacity was designated as a restored capacity. The charge/discharge was performed in a thermostat chamber set at 25° C.

Example 1

A crude oil produced in Liaoning, China (specific gravity: 28° API; wax content of 17% by mass and sulfur content of 0.66% by mass) was distilled under ordinary pressure. Using a Y-type zeolite catalyst in a sufficient amount against the heavy fraction, catalytic cracking in a fluidized bed was performed at 510° C. under ordinary pressure. A solid content such as a catalyst was centrifuged until the obtained oil became clear to thereby obtain decant oil. The oil was subjected to a small-sized delayed coking process. After keeping the drum inlet temperature at 505° C. and the drum internal pressure to 600 kPa (6 kgf/cm²) for ten hours, the drum was water-cooled to obtain black chunks. After pulverizing the obtained black chunks into pieces up to five centimeters in size with a hammer, they were dried in a kiln at 200° C. to obtain coke. The coke had an value of 0.32.

The obtained coke was pulverized with a bantam mill produced by Hosokawa Micron Corporation. Next, the pulverized coke is subjected to air classification with Turbo-classifier TC-15N produced by Nisshin Engineering Inc. to obtain a pulverized coke having D50 of 4 µm. A graphite crucible was filled with the pulverized coke and 3,000 ppm by mass of $V_2O_5$ in terms of vanadium (manufactured by Kojundo Chemical Laboratory Co., Ltd.; particle size: 75 µm or less) and subjected to heat treatment for one week so that the maximum reached temperature in Acheson furnace was adjusted to about 2,100° C. The energization was stopped to allow the furnace to cool naturally to 1,000° C., and the current was applied again so that the maximum reached temperature in Acheson furnace was adjusted to 3,100° C. to obtain a carbon material.

With respect to the obtained carbon material, the calculation of the interplanar spacing, $d_{002}$, and the size in the direction of c-axis, $Lc_{002}$, calculated from the powder X-ray diffractometry; measurement of the BET specific surface area; and calculation of the R value by Raman spectroscopy were conducted. In addition, a battery was fabricated using the obtained carbon material to perform the measurement of the discharge capacity, measurement of the initial coulomb efficiency, calculation of the PC durability, measurement of the cycle capacity retention rate (at 0° C. and 50° C.), and measurement of storage/restored capacity retention rate (at 60° C.)

Example 2

A test was performed in the same way as in Example 1 except that the maximum reached temperature in the first heating step was adjusted to 2,000° C.

Example 3

A test was performed in the same way as in Example 1 except that the maximum reached temperature in the first heating step was adjusted to 2,400° C.

Example 4

A test was performed in the same way as in Example 1 except that the maximum reached temperature in the first heating step was adjusted to 2,000° C., and allowing the furnace to cool naturally to 1,000° C., performing the second heating step in which the maximum reached temperature was adjusted to 2,400° C., again allowing the furnace to cool naturally to 1,000° C., and performing the third heating step in which the maximum reached temperature was adjusted to 3,100° C.

Example 5

A test was performed in the same way as in Example 1 except that the amount of $V_2O_5$ to be added was set to 200 ppm by mass in terms of vanadium.

Example 6

A test was performed in the same way as in Example 1 except that the amount of $V_2O_5$ to be added was set to 10,000 ppm by mass in terms of vanadium.

Example 7

A test was performed in the same way as in Example 1 except that vanadium carbide (VC) was used as a vanadium source to be added.

Example 8

A test was performed in the same way as in Example 1 except that D50 of the pulverized coke was adjusted to 3 μm.

Example 9

A test was performed in the same way as in Example 1 except that D50 of the pulverized coke was adjusted to 7 μm.

Example 10

A test was performed in the same way as in Example 1 except that D50 of the pulverized coke was adjusted to 3 μm, the amount of $V_2O_5$ to be added was set to 5,000 ppm by mass in terms of vanadium, and the maximum reached temperature in the second heating step was adjusted to 3,200° C.

Example 11

A test was performed by subjecting the carbon material manufactured in Example 1 was subjected to re-graphitization at 3,100° C. Evaluations of various properties were made in the same way as in Example 1.

Example 12

A test was performed in the same way as in Example 1 except that CaO (manufactured by Kojundo Chemical Laboratory Co., Ltd.) was added to the carbon material manufactured in Example 1 in an amount of 1,000 ppm by mass in terms of calcium.

Example 13

A test was performed in the same way as in Example 12 except that $CaCO_3$ was used as a calcium source to be added.

Comparative Example 1

A test was performed in the same way as in Example 1 except that the maximum reached temperature in the first heating step was adjusted to 1,600° C.

Comparative Example 2

A test was performed in the same way as in Example 1 except that the maximum reached temperature in the second heating step was adjusted to 3,300° C.

Comparative Example 3

A test was performed in the same way as in Example 1 except that the maximum reached temperature in the first heating step was adjusted to 3,100° C. and the second and the subsequent heating steps were not conducted.

Comparative Example 4

A test was performed in the same way as in Example 1 except that a vanadium source was not added.

Comparative Example 5

A test was performed in the same way as in Example 1 except that the amount of $V_2O_5$ to be added was set to 15,000 ppm by mass in terms of vanadium.

Comparative Example 6

A test was performed in the same way as in Example 1 except that D50 of the pulverized coke was adjusted to 8 μm.

Comparative Example 7

A test was performed in the same way as in Example 1 except that a vanadium source was not added, the maximum reached temperature in the first heating step was adjusted to 3,100° C. and the second and the subsequent heating steps were not conducted.

Comparative Example 8

A test was performed in the same way as in Comparative Example 7 except that a coke having an a value of 0.24 was used as a raw material.

Comparative Example 9

A test was performed in the same way as in Example 1 except that a coke having a value of 0.24 was used as a raw material.

Comparative Example 10

A test was performed in the same way as in Comparative Example 7 except that a coke having an α value of 0.45 was used as a raw material.

Comparative Example 11

A test was performed in the same way as in Example 1 except that a coke having an α value of 0.45 was used as a raw material.

Comparative Example 12

A test was performed in the same way as in Comparative Example 7 except that a coke having an α value of 0.56 was used as a raw material.

Comparative Example 13

A test was performed in the same way as in Example 1 except that a coke having an α value of 0.56 was used as a raw material.

Comparative Example 14

A test was performed in the same way as in Comparative Example 7 except that a coke having an α value of 0.64 was used as a raw material.

Comparative Example 15

A test was performed in the same way as in Example 1 except that a coke having an α value of 0.64 was used as a raw material.

Tables 1 to 3 show the results of Examples 1 to 10 and Comparative Examples 1 to 15. Tables 4 and 5 show the results of Examples 1, 11 and 12.

TABLE 1

| | Raw material | | Additives | | Heat treatment conditions | | | | |
|---|---|---|---|---|---|---|---|---|---|
| | | | Addition amount | | 1st maximum | | 2$^{nd}$ maximum | | 3$^{rd}$ maximum |
| | α value — | D50 after pulverization [μm] | of V [ppm by mass] | compound — | reached temperature °C. | Cooling temperature °C. | reached temperature °C. | Cooling temperature °C. | reached temperature °C. |
| Ex. 1 | 0.32 | 4 | 3000 | $V_2O_5$ | 2100 | 1000 | 3100 | — | — |
| Ex. 2 | 0.32 | 4 | 3000 | $V_2O_5$ | 2000 | 1000 | 3100 | — | — |
| Ex. 3 | 0.32 | 4 | 3000 | $V_2O_5$ | 2400 | 1000 | 3100 | — | — |
| Ex. 4 | 0.32 | 4 | 3000 | $V_2O_5$ | 2000 | 1000 | 2400 | 1000 | 1000 |
| Ex. 5 | 0.32 | 4 | 200 | $V_2O_5$ | 2100 | 1000 | 3100 | — | — |
| Ex. 6 | 0.32 | 4 | 10000 | $V_2O_5$ | 2100 | 1000 | 3100 | — | — |
| Ex. 7 | 0.32 | 4 | 3000 | VC | 2100 | 1000 | 3100 | — | — |
| Ex. 8 | 0.32 | 3 | 3000 | $V_2O_5$ | 2100 | 1000 | 3100 | — | — |
| Ex. 9 | 0.32 | 7 | 3000 | $V_2O_5$ | 2100 | 1000 | 3100 | — | — |
| Ex. 10 | 0.32 | 3 | 5000 | $V_2O_5$ | 2100 | 1000 | 3200 | — | — |
| Comparative Ex. 1 | 0.32 | 4 | 3000 | $V_2O_5$ | 1600 | 1000 | 3100 | — | — |
| Comparative Ex. 2 | 0.32 | 4 | 3000 | $V_2O_5$ | 2100 | 1000 | 3300 | — | — |
| Comparative Ex. 3 | 0.32 | 4 | 3000 | $V_2O_5$ | 3100 | — | — | — | — |
| Comparative Ex. 4 | 0.32 | 4 | 0 | — | 2100 | 1000 | 3100 | — | — |
| Comparative Ex. 5 | 0.32 | 4 | 15000 | $V_2O_5$ | 2100 | 1000 | 3100 | — | — |
| Comparative Ex. 6 | 0.32 | 8 | 3000 | $V_2O_5$ | 2100 | 1000 | 3100 | — | — |
| Comparative Ex. 7 | 0.32 | 4 | 0 | — | 3100 | — | — | — | — |
| Comparative Ex. 8 | 0.24 | 4 | 0 | — | 3100 | — | — | — | — |
| Comparative Ex. 9 | 0.24 | 4 | 3000 | $V_2O_5$ | 2100 | 1000 | 3100 | — | — |
| Comparative Ex. 10 | 0.45 | 4 | 0 | — | 3100 | — | — | — | — |
| Comparative Ex. 11 | 0.45 | 4 | 3000 | $V_2O_5$ | 2100 | 1000 | 3100 | — | — |
| Comparative Ex. 12 | 0.56 | 4 | 0 | — | 3100 | — | — | — | — |
| Comparative Ex. 13 | 0.56 | 4 | 3000 | $V_2O_5$ | 2100 | 1000 | 3100 | — | — |
| Comparative Ex. 14 | 0.64 | 4 | 0 | — | 3100 | — | — | — | — |
| Comparative Ex. 15 | 0.64 | 4 | 3000 | $V_2O_5$ | 2100 | 1000 | 3100 | — | — |

TABLE 2

| | Physical properties after graphitization | | | | | | | | |
|---|---|---|---|---|---|---|---|---|---|
| | D50 [μm] | 400 times tapping density [g/cm³] | BET specific surface area [m²/g] | R value [—] | d002 [nm] | −23660x d002 + 8010 [nm] | Lc [nm] | −23660x d002 + 8025 [nm] | Vandium content [ppm by mass] |
| Ex. 1 | 4 | 0.7 | 6.2 | 0.17 | 0.3365 | 48 | 55 | 63 | 300 |
| Ex. 2 | 4 | 0.7 | 6.1 | 0.18 | 0.3365 | 48 | 55 | 63 | 310 |
| Ex. 3 | 4 | 0.7 | 6.5 | 0.16 | 0.3365 | 48 | 56 | 63 | 280 |
| Ex. 4 | 4 | 0.7 | 6.2 | 0.17 | 0.3365 | 48 | 56 | 63 | 270 |
| Ex. 5 | 4 | 0.7 | 4.3 | 0.11 | 0.3365 | 48 | 54 | 63 | 60 |
| Ex. 6 | 4 | 0.6 | 9.2 | 0.23 | 0.3365 | 48 | 56 | 63 | 720 |
| Ex. 7 | 4 | 0.8 | 5.4 | 0.12 | 0.3365 | 48 | 53 | 63 | 440 |
| Ex. 8 | 3 | 0.5 | 9.6 | 0.25 | 0.3365 | 48 | 56 | 63 | 330 |
| Ex. 9 | 7 | 1.0 | 4.2 | 0.14 | 0.3365 | 48 | 53 | 63 | 280 |
| Ex. 10 | 3 | 0.4 | 11.7 | 0.29 | 0.3363 | 53 | 62 | 68 | 450 |
| Comparative Ex. 1 | 4 | 0.8 | 6.9 | 0.14 | 0.3365 | 50 | 48 | 65 | 320 |
| Comparative Ex. 2 | 4 | 0.7 | 8.2 | 0.08 | 0.3361 | 58 | 69 | 73 | <50 |
| Comparative Ex. 3 | 4 | 0.7 | 7.2 | 0.13 | 0.3365 | 48 | 46 | 63 | 330 |
| Comparative Ex. 4 | 4 | 0.9 | 3.8 | 0.08 | 0.3365 | 48 | 53 | 63 | <50 |
| Comparative Ex. 5 | 4 | 0.7 | 11.1 | 0.35 | 0.3365 | 48 | 57 | 63 | 1200 |
| Comparative Ex. 6 | 8 | 1.0 | 3.4 | 0.11 | 0.3365 | 48 | 53 | 63 | 270 |
| Comparative Ex. 7 | 4 | 0.8 | 4.6 | 0.03 | 0.3365 | 48 | 45 | 63 | <50 |
| Comparative Ex. 8 | 4 | 1.0 | 2.4 | 0.04 | 0.3366 | 46 | 39 | 61 | <50 |
| Comparative Ex. 9 | 4 | 0.9 | 4.3 | 0.14 | 0.3366 | 47 | 46 | 62 | 280 |
| Comparative Ex. 10 | 4 | 0.5 | 6.2 | 0.04 | 0.3361 | 58 | 75 | 73 | <50 |
| Comparative Ex. 11 | 4 | 0.4 | 7.9 | 0.20 | 0.3361 | 58 | 87 | 73 | 320 |
| Comparative Ex. 12 | 4 | 0.4 | 9.1 | 0.06 | 0.3357 | 67 | 152 | 82 | <50 |
| Comparative Ex. 13 | 4 | 0.3 | 10.8 | 0.21 | 0.3357 | 67 | 161 | 82 | 330 |
| Comparative Ex. 14 | 4 | 0.2 | 14.8 | 0.08 | 0.3356 | 70 | 202 | 85 | <50 |
| Comparative Ex. 15 | 4 | 0.2 | 16.4 | 0.27 | 0.3356 | 70 | 207 | 85 | 350 |

TABLE 3

| | Battery evaluation | | | | | | | | |
|---|---|---|---|---|---|---|---|---|---|
| | Capacity (electrolyte A) [mAh/g] | Initial efficiency (electrolyte A) [%] | Initial efficiency (electrolyte B) [%] | PC durability [%] | 500-cycle retention rate at 0° C. [%] | 500-cycle retention rate at 50° C. [%] | Storage capacity retention rate at 60° C. [%] | Restored capacity retention rate at 60° C. [%] | DC-IR [Ω] |
| Ex. 1 | 330 | 92 | 90 | 98 | 94 | 92 | 86 | 89 | 1.1 |
| Ex. 2 | 331 | 92 | 90 | 98 | 94 | 92 | 86 | 89 | 1.1 |
| Ex. 3 | 331 | 92 | 89 | 97 | 94 | 92 | 86 | 89 | 1.1 |
| Ex. 4 | 331 | 92 | 90 | 98 | 94 | 92 | 86 | 89 | 1.1 |
| Ex. 5 | 334 | 94 | 92 | 98 | 91 | 94 | 88 | 91 | 1.3 |
| Ex. 6 | 328 | 89 | 86 | 97 | 95 | 90 | 84 | 86 | 0.9 |
| Ex. 7 | 333 | 93 | 88 | 95 | 92 | 93 | 88 | 91 | 1.2 |
| Ex. 8 | 330 | 89 | 86 | 97 | 96 | 89 | 83 | 86 | 0.9 |
| Ex. 9 | 333 | 94 | 92 | 98 | 89 | 95 | 89 | 92 | 1.3 |
| Ex. 10 | 329 | 89 | 86 | 97 | 96 | 89 | 83 | 86 | 0.9 |
| Comparative Ex. 1 | 312 | 84 | 52 | 62 | 88 | 78 | 81 | 84 | 1.3 |
| Comparative Ex. 2 | 330 | 84 | 72 | 86 | 84 | 85 | 88 | 91 | 1.5 |
| Comparative Ex. 3 | 310 | 84 | 65 | 77 | 83 | 79 | 81 | 83 | 1.3 |

TABLE 3-continued

| | Battery evaluation | | | | | | | | |
|---|---|---|---|---|---|---|---|---|---|
| | Capacity (electrolyte A) [mAh/g] | Initial efficiency (electrolyte A) [%] | Initial efficiency (electrolyte B) [%] | PC durability [%] | 500-cycle retention rate at 0° C. [%] | 500-cycle retention rate at 50° C. [%] | Storage capacity retention rate at 60° C. [%] | Restored capacity retention rate at 60° C. [%] | DC-IR [Ω] |
| Comparative Ex. 4 | 327 | 89 | 79 | 89 | 85 | 90 | 87 | 90 | 1.4 |
| Comparative Ex. 5 | 320 | 86 | 83 | 97 | 91 | 81 | 80 | 82 | 0.8 |
| Comparative Ex. 6 | 331 | 94 | 92 | 98 | 84 | 95 | 90 | 93 | 1.5 |
| Comparative Ex. 7 | 307 | 82 | 46 | 56 | 81 | 82 | 83 | 86 | 1.6 |
| Comparative Ex. 8 | 291 | 87 | 55 | 63 | 80 | 85 | 85 | 87 | 1.7 |
| Comparative Ex. 9 | 315 | 94 | 93 | 99 | 88 | 91 | 86 | 89 | 1.4 |
| Comparative Ex. 10 | 287 | 67 | 33 | 49 | 72 | 72 | 85 | 87 | 1.5 |
| Comparative Ex. 11 | 342 | 89 | 72 | 81 | 94 | 90 | 87 | 90 | 1.0 |
| Comparative Ex. 12 | 270 | 56 | 25 | 45 | 70 | 64 | 81 | 84 | 1.3 |
| Comparative Ex. 13 | 355 | 87 | 65 | 75 | 94 | 88 | 82 | 86 | 0.8 |
| Comparative Ex. 14 | 232 | 42 | 18 | 43 | 72 | 55 | 74 | 80 | 1.2 |
| Comparative Ex. 15 | 361 | 85 | 57 | 67 | 95 | 81 | 75 | 81 | 0.7 |

TABLE 4

| | Additive after graphitization | | Reheating treatment conditions |
|---|---|---|---|
| | Addition amount of calcium [ppm by mass] | Compound | Maximum reached temperature ° C. |
| Ex. 1 | — | — | — |
| Ex. 11 | — | — | 3100 |
| Ex. 12 | 1000 | CaO | 3100 |
| Ex. 13 | 1000 | $CaCO_3$ | 3100 |

| | Physical properties after graphitization | | | | | | | | |
|---|---|---|---|---|---|---|---|---|---|
| | D50 [μm] | 400-times tapping density [g/cm³] | BET specific surface area [m²/g] | R value [—] | d002 [nm] | −23660x d002 + 8010 [nm] | Lc [nm] | −23660x d002 + 8025 [nm] | Vanadium content [ppm by mass] | Calcium content [ppm by mass] |
| Ex. 1 | 4 | 0.7 | 6.2 | 0.17 | 0.3365 | 48 | 55 | 63 | 300 | — |
| Ex. 11 | 4 | 0.7 | 6.3 | 0.17 | 0.3365 | 48 | 55 | 63 | 270 | — |
| Ex. 12 | 4 | 0.6 | 7.2 | 0.19 | 0.3365 | 48 | 55 | 63 | 270 | <10 |
| Ex. 13 | 4 | 0.6 | 7.4 | 0.19 | 0.3365 | 48 | 55 | 63 | 270 | <10 |

TABLE 5

| | Battery evaluation | | | | | | | | |
|---|---|---|---|---|---|---|---|---|---|
| | Capacity (electrolyte A) [mAh/g] | Initial efficiency (electrolyte A) [%] | Initial efficiency (electrolyte B) [%] | PC durability [%] | 500-cycle retention rate at 0° C. [%] | 500-cycle retention rate at 50° C. [%] | Storage capacity retention rate at 60° C. [%] | Restored capacity retention rate at 60° C. [%] | DC-IR [Ω] |
| Ex. 1 | 330 | 92 | 90 | 98 | 94 | 92 | 86 | 89 | 1.1 |
| Ex. 11 | 330 | 92 | 90 | 98 | 94 | 92 | 86 | 89 | 1.1 |

TABLE 5-continued

| | Capacity (electrolyte A) [mAh/g] | Initial efficiency (electrolyte A) [%] | Initial efficiency (electrolyte B) [%] | PC durability [%] | 500-cycle retention rate at 0° C. [%] | 500-cycle retention rate at 50° C. [%] | Storage capacity retention rate at 60° C. [%] | Restored capacity retention rate at 60° C. [%] | DC-IR [Ω] |
|---|---|---|---|---|---|---|---|---|---|
| Ex. 12 | 330 | 91 | 90 | 99 | 95 | 91 | 85 | 88 | 1.0 |
| Ex. 13 | 330 | 91 | 90 | 99 | 95 | 91 | 85 | 88 | 1.0 |

The R value increases and the $Lc_{002}$ value varies depending on the heat treatment conditions and the addition of a vanadium source, and all the results of the battery evaluations are improved (Example 1 and Comparative Example 7). This is because an effect equivalent to that of coating is obtained on the surface of the carbon material under the heat treatment conditions in Example 1, and vanadium has an effect of deactivating the surface. When only vanadium was added, it has an effect of decreasing DC-IR but it results in degradation of the battery characteristics at a high temperature (Comparative Examples 7 and 3). By changing the heat treatment conditions, all the battery characteristics can be improved but is less effective compared to Example 1 (Comparative Examples 7 and 4). Accordingly, it can be said that a synergetic effect is obtained by the combination of the heat treatment conditions and the addition of vanadium. When the heat treatment temperature exceeds 3,300° C., it results in excessive graphitization, and since the vanadium content becomes less than 50 ppm by mass, the R values decreases, resulting in decrease in the initial coulomb efficiency, PC durability and the like (Comparative Example 2). When vanadium is added in an excessively large amount, the R value and the BET specific surface area increase excessively, leading to the decrease in the initial coulomb efficiency and the decrease in battery characteristics at a high temperature (Comparative Example 5). When the raw material coke after pulverization has a D50 larger than 7 μm, the DC-IR value increases, thereby decreasing battery characteristics at a low temperature (Comparative Example 6). When the heat treatment is performed under the conditions such that the raw material has an α value out of the range of the present invention, an effect of attaining excellent PC durability and battery characteristics in all respects at a low temperature and a high temperature cannot be attained even if vanadium is added. Thus, it can be said that there exists a coke which is suitable for the present invention (Comparative Examples 8 to 15). The carbon material obtained by the present invention undergoes little change in physical properties and characteristics if the material as it is subjected to re-graphitization (Example 11). Also, if a calcium compound is added at the time of performing re-graphitization, the BET specific surface area increases, and it enables improvements of decreasing the DC-IR value and the like (Examples 12, 13).

INDUSTRIAL APPLICABILITY

The battery using the carbon material of the present invention can be used as a battery used in various fields. The battery can be adopted as a battery used in, for example, electric and electronic equipment such as personal computers, tablet computers, notebook computers, mobile phones, wireless equipment, electronic notepads, electronic dictionary, Personal Digital Assistant (PDA), electronic meter, electronic keys, electronic tags, power storage equipment, electric tools, toys, digital cameras, digital video, audiovisual apparatus, a vacuum cleaner; transport facilities such as electric vehicles, hybrid vehicles, electric motorcycles, hybrid motorcycles, electric bicycles, power-assisted bicycles, railway facilities, airplanes, and vessels; power generating systems such as photovoltaic systems, wind generator systems, tidal-power generation systems, geothermal generation systems, temperature difference power generation systems, and vibration power generation systems.

The invention claimed is:

1. A carbon material containing 50 to 1,000 ppm by mass of vanadium (V), wherein a 50% particle diameter in a volume-based cumulative particle size distribution measured by a laser diffraction method, D50, is 3 to 7 μm; a tapping density after 400 times of tapping is 0.40 to 1.00 g/cm$^3$; a BET specific surface area is 4.0 to 12.0 m$^2$/g; an R value (ID/IG) as being an intensity ratio between a peak intensity ID of a peak in a vicinity of 1350 cm$^{-1}$ and a peak intensity IG of a peak in a vicinity of 1580 cm$^{-1}$ measured in a spectrum observed by Raman spectroscopy is 0.10 to 0.30; and an interplanar spacing of (002) plane, $d_{002}$ (nm), and a size in a c-axis direction of the graphite crystals, Lc (nm), which values are determined by an X-ray diffraction method, satisfy relationships represented by following formulae (1) and (2)

$$0.3362 \leq d_{002} \leq 0.3370 \quad (1)$$

$$-23660 \times d_{002} + 8010 \leq Lc_{002} \leq -23660 \times d_{002} + 8025 \quad (2).$$

2. The carbon material according to claim 1, wherein vanadium contained in the carbon material exists as at least one compound selected from an oxide and a carbide.

3. The carbon material according to claim 2, wherein the carbide is at least one member selected from VC, $V_4C_3$ and $V_5C$.

4. The carbon material according to claim 2, wherein the oxide is at least one member selected from VO, $V_2O_3$, $V_2O_5$, $VO_2$ and $V_6O_{13}$.

5. The carbon material according to claim 1, wherein vanadium is uniformly distributed from the surface to the core portion of graphite particles.

6. A method for producing a carbon material, the carbon material containing 50 to 1,000 ppm by mass of vanadium (V), wherein a 50% particle diameter in a volume-based cumulative particle size distribution measured by a laser diffraction method, D50, is 3 to 7 μm; a tapping density after 400 times of tapping is 0.40 to 1.00 g/cm$^3$; a BET specific surface area is 4.0 to 12.0 m$^2$/g; an R value (ID/IG) as being an intensity ratio between a peak intensity ID of a peak in a vicinity of 1350 cm$^{-1}$ and a peak intensity IG of a peak in a vicinity of 1580 cm$^{-1}$ measured in a spectrum observed by Raman spectroscopy is 0.10 to 0.30; and an interplanar spacing of (002) plane, $d_{002}$ (nm), and a size in a c-axis direction of the graphite crystals, Lc (nm), which values are determined by an X-ray diffraction method, satisfy relationships represented by following formulae (1) and (2)

$$0.3362 \leq d_{002} \leq 0.3370 \quad (1)$$

$$-23660 \times d_{002} + 8010 \leq Lc_{002} \leq -23660 \times d_{002} + 8025 \quad (2)$$

the method comprising graphitization using coke as a raw material, in which coke a 50% particle diameter in a volume-based cumulative particle size distribution measured by a laser diffraction method, D50, is 7 μm or less, and the a value defined by a following formula:

$$\alpha = S1/S2$$

is 0.25 to 0.40, wherein S1 represents the sum of a peak areas of aromatic hydrocarbons in which 4 benzene rings are condensed in the volatile components of the coke in a GC-MS chart, and S2 represents the sum of peak areas of aromatic hydrocarbons in which 1 to 4 benzene rings are condensed in a GC-MS chart, and wherein the graphitization is conducted by adding a vanadium compound in an amount of 200 to 10,000 ppm by mass in terms of vanadium to the raw material; the graphitization step comprises multiple heating steps; a temperature in a last heating step is set to 3,000 to 3,200° C.; and temperatures in other heating steps than the last heating step is set to 2,000 to 2,400° C.

7. The method for producing a carbon material according to claim 6, comprising a cooling step between each heating step so as to decrease a treatment temperature to 1,300° C. or lower.

8. The method for producing a carbon material according to claim 6, comprising adding a calcium compound that is at least one member selected from $CaO$, $Ca(OH)_2$, $CaCO_3$, $Ca(COO)_2$, $Ca(CH_3COO)_2$, $Ca(NO_3)_2$ in an amount of 1 to 10,000 ppm by mass in terms of calcium to the carbon material treated in the above-described graphitization step and conducting re-graphitization at 3,000 to 3,200° C.

9. A carbon material for a battery electrode comprising the carbon material according to claim 1.

10. A paste for an electrode comprising the carbon material for a battery electrode according to claim 9 and a binder.

11. An electrode for a lithium ion secondary battery comprising a formed body of the paste for an electrode according to claim 10.

12. A lithium-ion secondary battery comprising the electrode according to claim 11 as a constituting element.

13. The lithium ion secondary battery according to claim 12, using an electrolyte containing 20 vol % or more of propylene carbonate (PC).

* * * * *